United States Patent
Schroeder et al.

(10) Patent No.: US 9,574,653 B2
(45) Date of Patent: Feb. 21, 2017

(54) RING GEAR STABILIZATION FOR POWERGLIDE TRANSMISSIONS

(71) Applicant: Sonnax Industries, Inc., Bellows Falls, VT (US)

(72) Inventors: Randall R. Schroeder, Carpinteria, CA (US); Brian G. Rowell, Saxtons River, VT (US); Gregg A. Nader, Chester, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 36 days.

(21) Appl. No.: 14/567,503

(22) Filed: Dec. 11, 2014

(65) Prior Publication Data

US 2015/0167822 A1 Jun. 18, 2015

Related U.S. Application Data

(60) Provisional application No. 61/915,306, filed on Dec. 12, 2013, provisional application No. 62/010,529, filed on Jun. 11, 2014.

(51) Int. Cl.
*F16H 57/08* (2006.01)

(52) U.S. Cl.
CPC ............ *F16H 57/082* (2013.01); *F16H 57/08* (2013.01); *F16H 2057/087* (2013.01); *Y10T 29/49464* (2015.01)

(58) Field of Classification Search
CPC ... F16H 57/08; F16H 57/082; F16H 2057/087
USPC ........................................ 475/331, 346, 347
See application file for complete search history.

(56) References Cited

U.S. PATENT DOCUMENTS

| 2,469,905 A * | 5/1949 | Tatlow ...................... F16H 1/46 475/337 |
| 2005/0209038 A1* | 9/2005 | Kempf ...................... B60K 6/36 475/159 |
| 2006/0205560 A1* | 9/2006 | Meier ...................... F16H 55/17 475/331 |

(Continued)

FOREIGN PATENT DOCUMENTS

| BE | EP 2172673 A1 * | 4/2010 | ............ F16H 57/082 |
| FI | WO 2009083657 A1 * | 7/2009 | ............ F16H 1/2836 |
| JP | EP 0854306 A2 * | 7/1998 | ............. F16D 41/07 |

OTHER PUBLICATIONS

Automatic Transmission Service Guide; Aluminum Case Powerglide Transmission; 1-F through 39-F; 146 pgs.

*Primary Examiner* — Roger Pang
(74) *Attorney, Agent, or Firm* — Downs Rachlin Martin PLLC

(57) ABSTRACT

Systems and methods for stabilizing the ring gear in a Powerglide transmission are disclosed. Systems may include a radial stabilization member mountable to the planet carrier and individual bearing members mountable to an inner surface of the ring gear in opposition to the radial stabilization member. Axial stabilization may also be provided by an axial stabilization member configured and dimensioned to be positioned between the ring gear mid-step and reverse clutch pack apply plate. Methods include mounting the radial stabilization member on the planet carrier using attachment means and securing the bearing members to the inner surface of the ring gear in a spaced relationship.

16 Claims, 5 Drawing Sheets

(56) References Cited

U.S. PATENT DOCUMENTS

2011/0028265 A1\* 2/2011 Johnson ................ B60K 17/16
                                                                                                475/331

\* cited by examiner

RING GEAR STABILIZATION FOR POWERGLIDE TRANSMISSIONS

RELATED APPLICATION DATA

This application claims the benefit of priority of U.S. Provisional Patent Application Ser. No. 61/915,306, filed on Dec. 12, 2013, and titled "Powerglide Ring Gear Stabilizer," and U.S. Provisional Patent Application Ser. No. 62/010,529, filed Jun. 11, 2014, and titled "Powerglide Ring Gear Stabilizer." Each of these applications is incorporated by reference herein in its entirety.

FIELD OF THE INVENTION

The present invention generally relates to the field of automotive transmissions. In particular, the present invention is directed to a ring gear stabilization system and method for Powerglide automatic transmissions.

BACKGROUND

The Powerglide transmission was one of the first automatic transmissions developed by General Motors, initially introduced in 1952. Although General Motors itself phased out the Powerglide transmission in 1973, the basic design of the aluminum housing Powerglide, introduced in 1962, is still used today, especially in niche automotive applications, including in automobile powertrains designed for racing. The Powerglide transmission design has remained popular for drag racing due, in part, to the strength, durability and simplicity of the two-speed design. Indicative of the Powerglide's continued popularity, it is today possible to purchase a newly manufactured complete Powerglide transmission or to build an entire Powerglide transmission from aftermarket parts, and a cottage industry has developed around improving the performance of the Powerglide transmission design in racing applications. Because of this history, entire transmissions as well as complete replacement parts built to original equipment ("OE") dimensions and specifications continue to be readily available in the market. Thus, for the sake of clarity, "OE Powerglide" as used herein refers specifically to Powerglide transmissions as originally manufactured by General Motors, while Powerglide, generally, includes both OE Powerglide transmissions and all transmissions based on the OE Powerglide design, but which may have aftermarket modifications. FIG. illustrates, in cross-section, the parts of an OE "aluminum case" Powerglide transmission. Table 1, at the end of the specification, includes a list of the parts shown in FIG. 6, which is extracted from a Powerglide service guide, circa 1965 (available for download at http://cogpro.com/chapters/F-Powerglide/index.htm), which is incorporated by reference herein in its entirety.

As an early automatic transmission design, the Powerglide differs from current designs in some respects. Most rotating parts in modern automotive transmissions have predefined, finite limitations on axial movement (commonly controlled with thrust washers/bearings) and radial movement (commonly controlled with bushings or roller bearings). These constraints help to stabilize the components and control excessive vibration. The ring gear of the Powerglide transmission, however, has no supports specifically intended to limit radial movement. The ring gear does have contact surfaces to limit axial movement to some extent, however, still the total axial movement can be excessive in many situations.

In applications with high horsepower, such as drag racing, it can be particularly important to stabilize the rotating parts of the transmission to reduce the axial and radial movement to prevent wear. With the Powerglide transmission, the combination of the radial and axial movements can lead to uncontrolled movement of the ring gear off of the transmission centerline and can also cause undesirable vibrations, particularly at higher rotational speeds, such as those seen in racing transmissions.

Within the Powerglide transmission, the ring gear engages pinion gears of a planet carrier and also has a splined, rearwardly directed section that engages the reverse clutch friction plates. The portion of the ring gear engaging the reverse clutch friction plates is not well supported. While operating in forward gear ranges, the reverse clutch is not engaged and, as a result, the reverse clutch friction plates follow the oscillations of the ring gear. The oscillations and misalignment of the ring gear affects ring gear and planet carrier wear, ring gear reverse clutch spline wear, and fatigue of the reverse clutch friction plates. For example, the thin steel spline of the reverse clutch friction plates wear and deform from the pulsing that occurs, pulsing causes additional wear on the ring gear spline where cavities form as a result and the friction plates may even fracture. These deformities can lead to capturing of the friction plates, further restricting the free movement of the friction plates being driven by the ring gear oscillations. Furthermore, the misalignment of gear teeth can result in uneven and premature wear of gear teeth. The oscillations of the ring gear cause greater friction in the transmission which results in less overall horsepower.

SUMMARY OF THE DISCLOSURE

In one implementation, the present disclosure is directed to a ring gear stabilization system for a Powerglide transmission. The system includes a radial stabilization plate having a central web surrounded by an annular bearing flange with an overall outer diameter sized to fit inside the ring gear, the central web defining (i) a central opening configured to receive the Powerglide output shaft therethrough and (ii) a plurality of peripheral openings positioned in the central web and dimensioned to receive at least one pinion shaft end when the central web is mounted to the Powerglide planet carrier; and a plurality of bearing members configured and dimensioned to (i) be secured to an inner annular surface of the ring gear in a spaced relationship there around, and (ii) bear against the annular bearing flange to stabilize the ring gear.

In another implementation, the present disclosure is directed to a method for stabilizing the ring gear in a Powerglide transmission. The method includes mounting a radial stabilization plate to a rear facing surface of the Powerglide planet carrier, the radial stabilization plate having a central web surrounded by an annular bearing flange; attaching a plurality of bearing members to an inner surface of the ring gear in a location opposing the annular bearing flange when the radial stabilization plate is mounted on the planet carrier.

In yet another implementation, the present disclosure is directed to a ring gear stabilization system for a Powerglide transmission. The system includes a radial stabilization plate configured and dimensioned to be mounted on the Powerglide transmission planet carrier inside the ring gear, the radial stabilization plate having a central web surrounded by an annular bearing flange with an overall outer diameter sized to fit inside the ring gear, the central web defining a central opening configured to receive the Powerglide output shaft therethrough and a plurality of peripheral openings positioned in the central web and dimensioned to receive at least two pinion shaft ends protruding from the Powerglide planet carrier, the peripheral openings being positioned so as to center the central web on the planet carrier when the at least two pinion shaft ends are received therein; and a plurality of bearing members configured and dimensioned to be secured to an inner annular surface of the ring gear in a spaced relationship there around, and to bear against the annular bearing flange to stabilize the ring gear when the radial stabilization plate is mounted on the planet carrier.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for stabilizing a ring gear in a Powerglide transmission. Embodiments of a ring gear stabilization system as described herein for a Powerglide transmission may eliminate or reduce undesirable vibrations resulting in smoother operation and allowing for a more desirable driving experience. In some embodiments, the ring gear stabilization system may include a radial stabilization plate and a plurality of bearing members that stabilize the ring gear in a radial direction, reduce wear and deformation of friction clutch splines, and reduce undesirable vibrations. In other embodiments, the ring gear stabilization system may further include an axial ring gear stabilizer to provide additional support and stabilization in the axial direction. Various other embodiments are described herein and after reading this disclosure in its entirety, a person of skill in the automotive transmission arts will appreciate the benefits of such embodiments.

Figure 1:
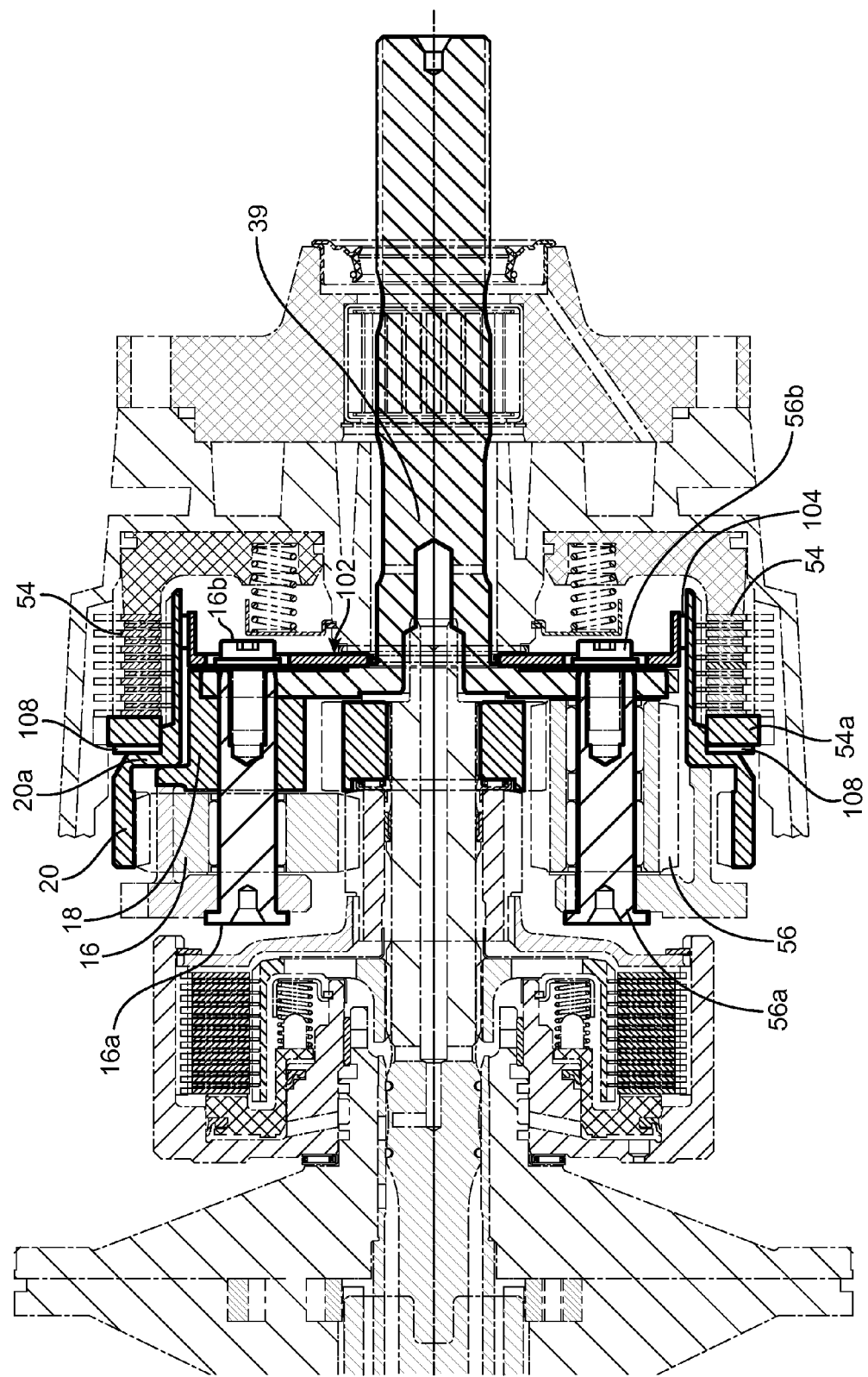
FIG. 1 is a cross-sectional view of a Powerglide transmission including an exemplary embodiment of a ring gear stabilization system.
Figure 2:
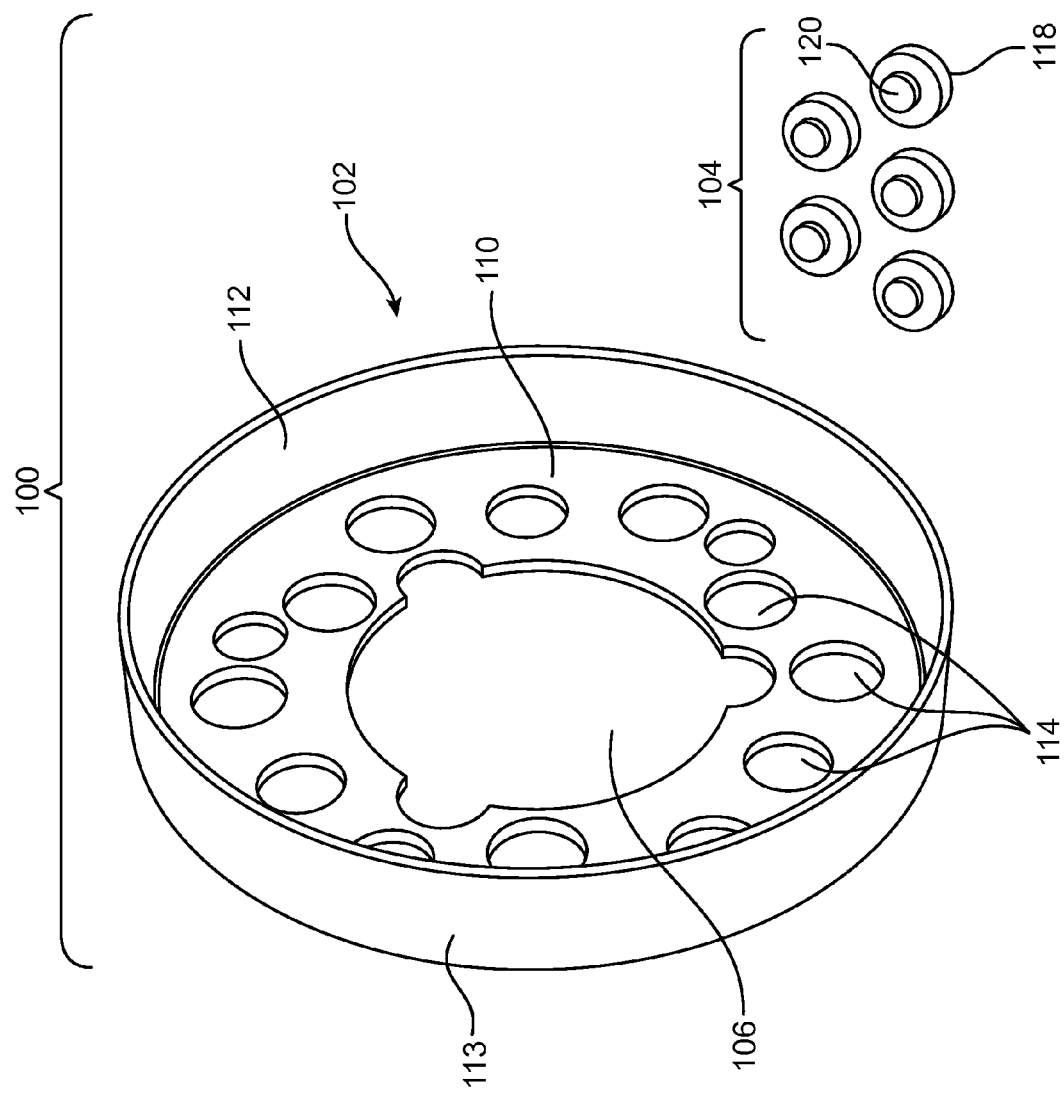
FIG. 2 is a perspective view of an exemplary ring gear stabilization system according to one embodiment of the present invention.

Referring to FIGS. 1 and 2, an exemplary embodiment of a ring gear stabilization system 100 is illustrated. Ring gear stabilization system 100 includes radial stabilization plate 102 and bearing members 104. Radial stabilization plate 102 is positioned inside the inner diameter of ring gear 20 and may be mounted to planet carrier 18, with output shaft 39 extending through a central opening 106 in the radial stabilization plate. Bearing members 104 are attached to the inner diameter of the ring gear to bear against radial stabilization plate 102, occupying the space between the ring gear and radial stabilization plate 102, thereby providing radial support to the ring gear during operation of the transmission.

Reverse clutch pack 54 includes friction plates in operative communication with the outer diameter of the rearward, splined section of ring gear 20. Planet carrier 18 houses short pinion gear 16 that engages the inside diameter of the ring gear forward of the splined section and clutch pack 54. Short pinion gear 16 is mounted in planet carrier 18 on a shaft 16a that may protrude from the rear end of the planet carrier and may be secured by a bolt, rivet or other suitable means 16b, which may vary according to different aftermarket designs. Similarly, long pinion gear 56 is mounted on a shaft 56a that may protrude from the rear of planet carrier 18, again secured by bolt, rivet, or other suitable means. These securing means together with any portion of the pinion shafts that protrude from the planet carrier are referred to hereinafter as "pinion shaft ends" 56b. When in forward gear ranges, the ring gear engages the pinion gears of the planet carrier and at high speeds, which may result in unfavorable vibration. But due to positioning radial stabilization plate 102 and bearing members 104, the inside diameter of the splined section of the ring gear is supported to prevent such vibrations.

Also shown in FIG. 1 is axial ring gear stabilizer 108. Axial ring gear stabilizer 108 may be positioned annularly at the mid-step 20a of ring gear 20, and between ring gear 20 and reverse clutch pressure plate 54a in accordance with one embodiment. More details of axial ring gear stabilizer 108 are discussed below in connection with FIG. 3.

Referring again to FIGS. 1 and 2, ring gear stabilization system 100 includes at least radial stabilization plate 102 and bearing members 104. Radial stabilization plate 102 has a central web 110 surrounded by an annular bearing flange 112, with an overall diameter sized to fit inside the splined section of ring gear 20. Central web 110 of radial stabilization plate 102 defines central opening 106 configured and dimensioned to permit the Powerglide output shaft to pass therethrough without interference. A plurality of peripheral openings 114 arranged around central opening 106 are configured and dimensioned to receive and permit clearance around pinion shaft ends. Additional peripheral openings may serve to receive attachment means for mounting radial stabilization plate 102 to planet carrier 18.

Figure 5:
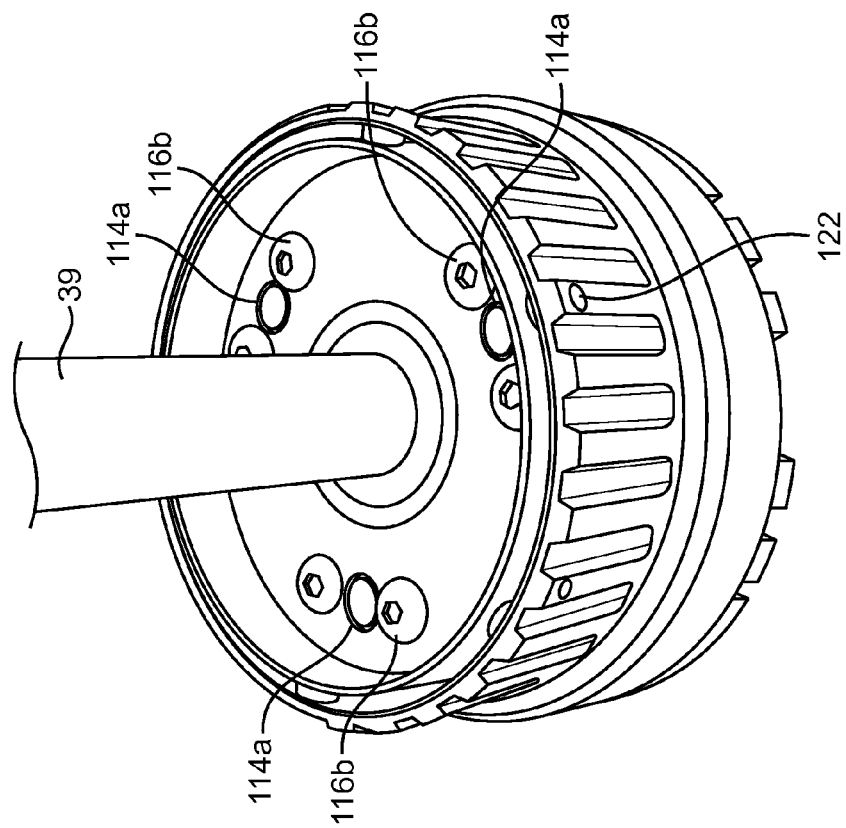
FIG. 5 is a perspective view of a Powerglide transmission planet carrier with an alternative embodiment of a ring gear stabilization system mounted thereon.
Figure 4:
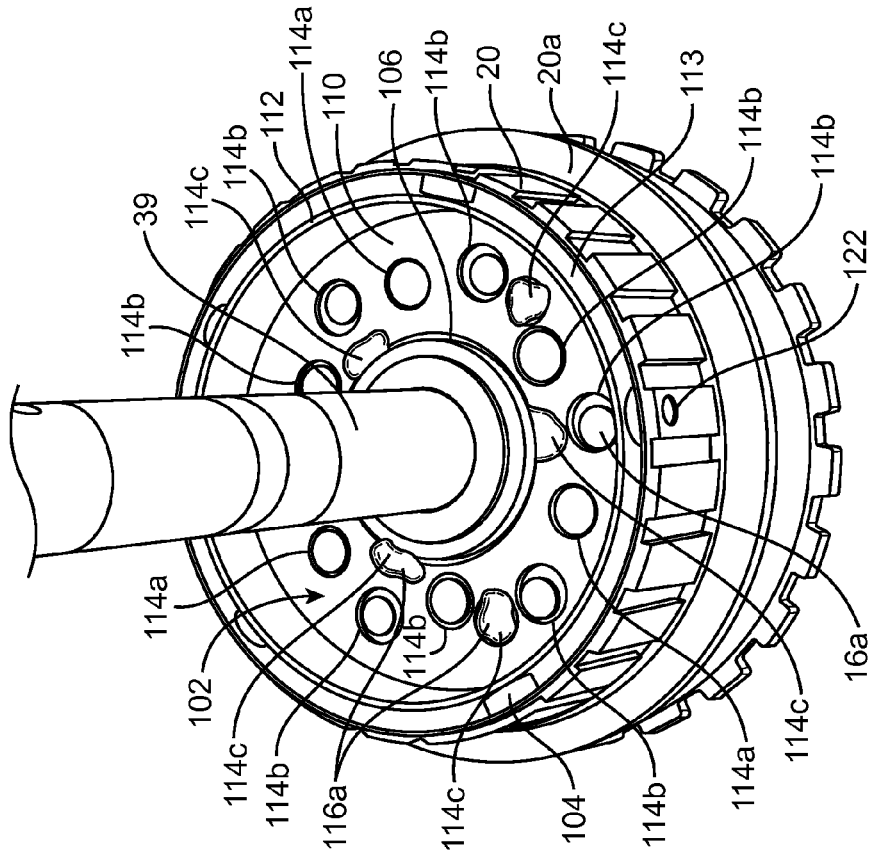
FIG. 4 is a perspective view of a Powerglide transmission planet carrier with an embodiment of a ring gear stabilization system mounted thereon.

Radial stabilization plate 102 may be attached or mounted to planet carrier 18 in a variety of ways. For example, as shown in FIG. 4, central web 110 may be welded to the surface of the planet carrier at select ones of peripheral openings 114 to form attachment means 116a. Alternatively, as shown in FIG. 5, radial stabilization plate 102 may be attached with bolts 116b through select peripheral openings 114. Providing a plurality of peripheral openings 114 in different positions may further provide a variety of attachment point options to facilitate mounting radial stabilizer plate 102 in different aftermarket modification conditions.

Figure 3:
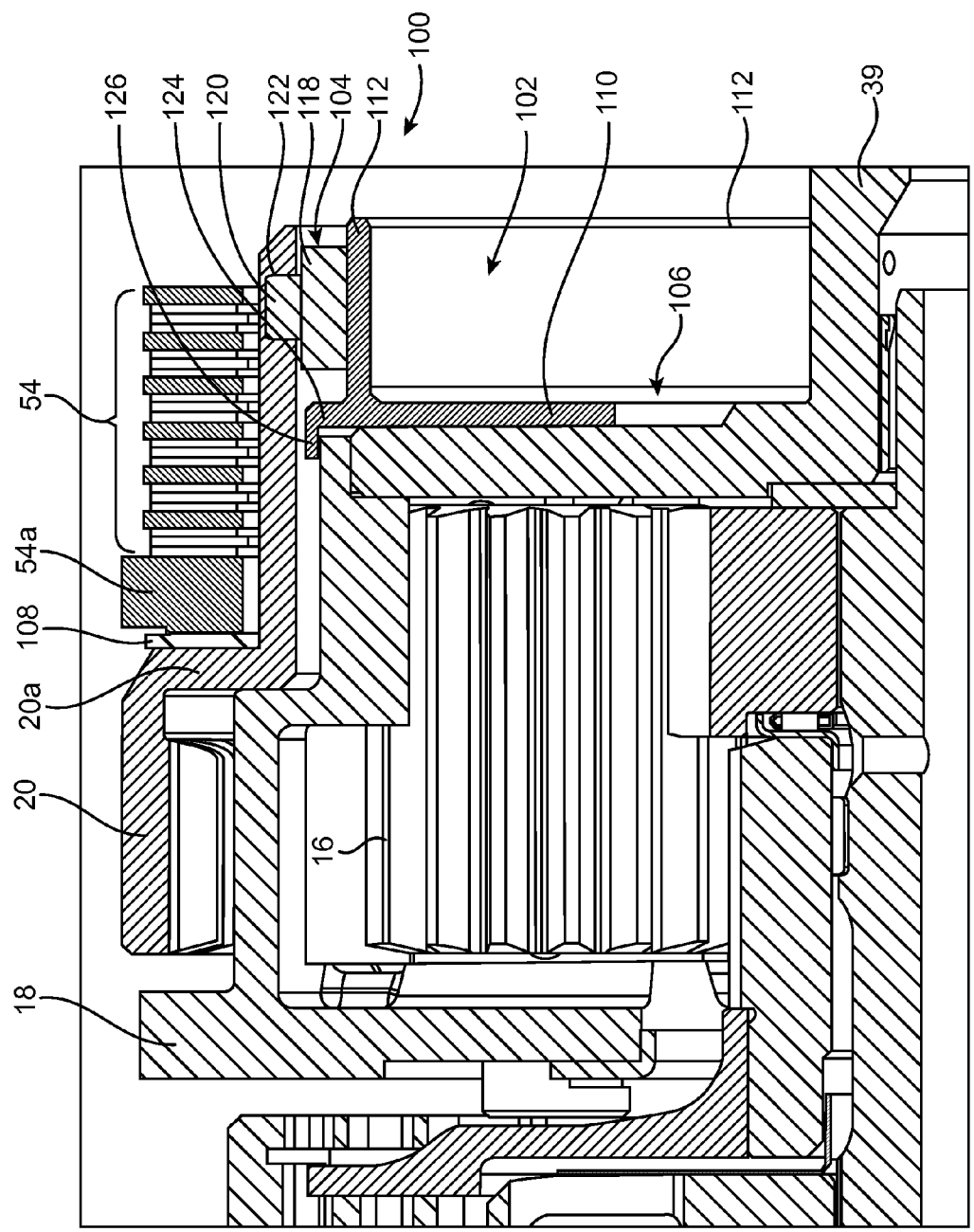
FIG. 3 is a partial cross-sectional view of an embodiment of a ring gear stabilization system mounted to a Powerglide transmission planet carrier.

As shown in FIG. 2, to facilitate attachment, bearing members 104 may have a bearing end 118 with a first diameter and an attachment end 120 with a narrower second diameter. Referring to FIGS. 3-5, holes 122 are created in the inside diameter of the splined section of ring gear 20 to receive attachment ends 120 to secure bearing members 104 to the inner annular surface of ring gear 20. Holes 122 may be configured and dimensioned to provide for an interference fit when attachment end 120 of bearing members 104 is placed therein. Holes 122 may be through holes as shown in FIGS. 4 and 5, or may be formed as blind holes as shown in FIG. 3 so as to remove less material from the ring gear. Bearing end 118 of bearing members 104 may be configured and dimensioned to contact smooth bearing surface 113 of annular bearing flange 112 to stabilize the ring gear. In one exemplary embodiment, bearing members 104 may be formed with an arc of bearing end 118 that conforms to the curved surface of both of the ring gear and the radial stabilization plate. One advantage of attaching bearing members in the ring gear is the ability to control the required surface finish of bearing surface 113. For example, the finish of the inner annular surface of a ring gear is often varied as a result of different manufacturing standards set forth by manufactures of ring gears, wear and other factors. Due to these inconsistencies, it is beneficial to provide a predictable and easily controlled bearing surface 113 on the outside of annular bearing flange 112 of radial stabilization plate 102. By using a plurality of individual bearing members 104 attached to the inner surface of the ring gear, the effect of any eccentricities or irregularities in that surface is minimized.

Bearing members 104 may be composed of any number of suitable bearing materials such as different plastics, bronze, or any wear resistant material. Bearing member material properties to be considered include high temperature resistance, lubricity, toughness, and cost. For example, PTFE (Teflon™), Delrin, nylon, or nylon MDS (Molybdenum Disulfide filled nylon) may be suitable materials for bearing members 104. Bearing members 104 also may be provided in a variety of sizes and configurations which may be influenced by the expected operating conditions in the transmission, the type of material the bearing members may be composed of, as well as the dimensions of the transmission as discussed above.

As will be appreciated by persons skilled in the art, ring gear stabilization system 100 may be designed and configured to provide ring gear stabilization in various size and gear ratio Powerglide transmissions. This is particularly useful due to the wide variety of aftermarket modifications available. For example, ring gear stabilization system 100 may include a radial stabilization plate 102 configured and dimensioned to fit within a radius of a ring gear of various size and gear ratio transmissions and may further include multiple sets of bearing members, with each set configured and dimensioned to stabilize the ring gear in a different aftermarket configuration. For example, in one alternative, the outer diameter of radial stabilization plate 102 may be sized to fit the smallest planet carrier and the thickness of the bearing members 104 may be increased to stabilize the ring gear for larger planet carriers. In further alternatives, different numbers or positions of bearing members 104 may be used. For example, as shown in FIG. 4, five bearing members 104 are positioned at substantially equal spacings and at substantially the same relative axial position. It is noted that although five bearing members are shown, other numbers and positions of bearing members 104 may be appropriate. For example, the demands on a particular transmission may require that two bearing members be installed while the demands on other transmissions may require that five or more bearing members be installed to reduce vibrations and enhance performance.

In order to install ring gear stabilization 100 system, planet carrier 18 and ring gear 20 are removed from the transmission in accordance with standard service procedures. It may be desirable to inspect the rear surface of planet carrier 18 at this point and remove imperfections such as high points or burrs before proceeding. Next, the fasteners securing the pinion shaft retainer plate located on the front of the planet carrier are removed. From the front of the planet carrier, three of the six pinion gear shafts are pushed rearward until flush with the front of the planet carrier, thus causing the pinion shaft ends to protrude slightly from rear of planet carrier. The pinion shaft retainer plate is then temporarily reinstalled. With the pinion shaft ends still slightly protruding, the radial stabilization plate 102 is placed on the rear of the planet carrier with the pinion shaft ends received in three peripheral alignment openings 114a, thus locating and centering the radial stabilization plate. Peripheral clearance openings 114b are located on web 110 to align with the remaining three pinion shaft ends and any other protrusions as may be present in specific aftermarket designs.

With the radial stabilization plate 102 properly located and seated on planet carrier 18, it can be secured using various attachment means as discussed above, for example, welds 116a as in FIG. 4, or screws 116b as in FIG. 5, applied at additional peripheral openings 114c. Once radial stabilization plate 102 is safely secured, the protruding pinion shaft ends, which provided the alignment for attachment, may be returned to their operative positions and ring gear 20 and planet carrier 18 conventionally reassembled into the transmission. Bearing members 104 are installed on ring gear 20 as explained above before reassembly.

As mentioned above, certain of peripheral openings 114a, 114b are specifically positioned and dimensioned to provide for clearance of protrusions from a planet carrier such as pinion shaft ends, bolts or screws 116b and 56b or rivets. Additionally or alternatively, radial stabilization plate 102 may include varied sizes or numbers of peripheral openings 114 so that the radial stabilization plate may be attached to a variety of planet carriers with varied surface protrusion placements, such as planet carriers with different gear ratios.

Referring again to FIG. 3, another alternative embodiment or feature of ring gear stabilization system 100 is shown. In this embodiment axial ring gear stabilizer 108 is shown positioned between the mid-step 20a of ring gear 20 and reverse clutch pressure plate 54a. Axial ring gear stabilizer 108 occupies any void that may exist between ring gear mid-step 20a and reverse clutch pressure plate 54a, thereby further reducing undesirable vibrations associated with ring gear 20. Axial ring gear stabilizer 108 may be used in addition to radial stabilization plate 102 and bearing members 104 as described above. Axial ring gear stabilizer 108 may be composed of a variety of appropriate materials that have high heat and wear resistance for longevity such as, but not limited to, polymers, metals, bimetal bronze and combinations thereof. Furthermore, axial ring gear stabilizer 108 may be incorporated into the design or configuration of the reverse clutch pressure plate or the ring gear. For example, it may be advantageous for a manufacturer of a Powerglide transmission or aftermarket parts to limit undesirable vibrations associated with the ring gear of a transmission and the manufacturer may decide to include axial ring gear stabilizer 108 as part of the design or configuration of the reverse clutch pressure plate or the ring gear.

In another alternative embodiment, also shown in FIG. 3, radial stabilization plate 102 may additionally include annular support flange 124 at the outermost diameter of radial stabilization plate 102. Annular support flange 124 may be positioned to extend substantially in parallel with both ring gear 20 and an outer surface of planet carrier 18. Annular support flange 124 may provide additional support to ring gear 20, especially in high load/deflection situations where bearing member 104 or an outer part of the ring gear itself may deform. As shown in FIG. 3, annular support flange 124 is formed in an L-shape, integral with radial stabilization plate 102. Persons of ordinary skill will appreciate that it also may be formed as a separate piece and attached to radial stabilization plate 102. When formed as a separate piece, it may be desirable to use a bearing material, such as described above for bearing member 104. Also, leg 126 of annular support flange 124 may extend further axially into the space between ring gear 20 and planet carrier 18 to provide greater support.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

TABLE 1

Figure 6:
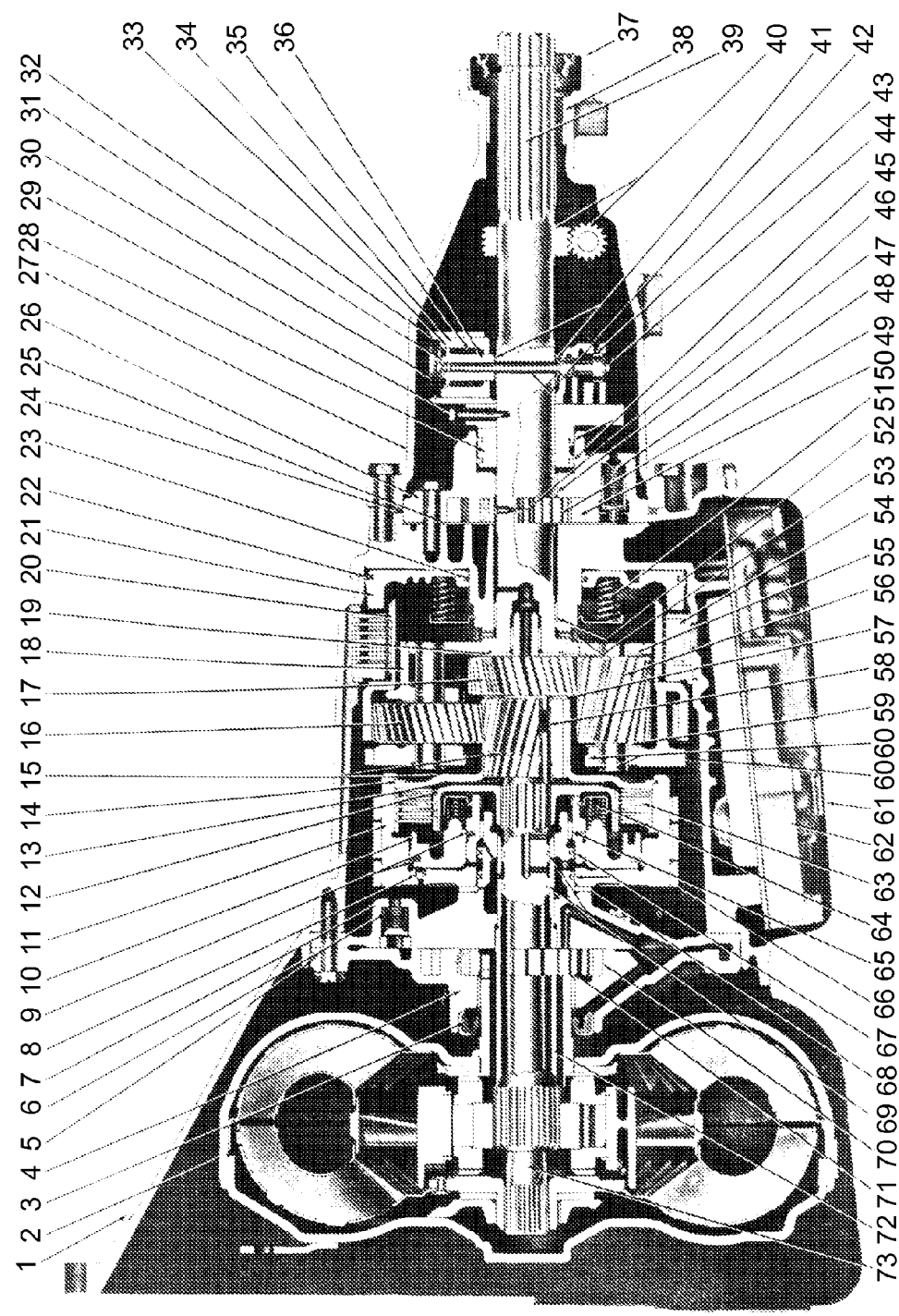
FIG. 6 is a cross-sectional diagram of an OE Powerglide transmission excreted from an Aluminum Case Powerglide service guide.

OE Powerglide Transmission Parts List (FIG. 6)

1. Transmission Case
2. Welded Converter
3. Front Oil Pump Seal Assembly
4. Front Oil Pump Body
5. Front Oil Pump Body Square Ring Seal
6. Lube Relief Valve
7. Front Oil Pump Cover
8. Clutch Relief Valve Ball
9. Clutch Piston Inner and Outer Seal
10. Clutch Piston
11. Clutch Drum
12. Clutch Hub
13. Clutch Hub Thrust Washer
14. Clutch Flange Retainer Ring
15. Lowe Sun Gear and Clutch Flange Assembly
16. Planet Short Pinion
17. Planet Input Sun Gear
18. Planet Carrier
19. Planet Input Sun Gear Thrust Washer
20. Ring Gear
21. Reverse Piston
22. Reverse Piston Outer Seal
23. Reverse Piston Inner Seal
24. Extension Seal Ring
25. Rear Pump Wear Plate
26. Rear Pump
27. Extension
28. Governor Hub
29. Governor Hub Drive Screw
30. Governor Body
31. Governor Shaft Retainer Clip
32. Governor Outer Weight Retainer Ring
33. Governor Inner Weight Retainer Ring
34. Governor Outer Weight
35. Governor Spring
36. Governor Inner Weight
37. Extension Rear Oil Seal
38. Extension Rear Bushing
39. Output Shaft
40. Speedometer Drive and Driven Gear
41. Governor Shaft Belleville Springs
42. Governor Shaft
43. Governor Valve
44. Governor Valve Retaining Clip
45. Governor Hub Seal Rings
46. Rear Pump Drive Pin
47. Rear Pump Bushing
48. Rear Pump Priming Valve
49. Rear Pump Drive Gear
50. Rear Pump Driven Gear
51. Reverse Piston Return Springs, Retainer and Retainer Ring
52. Transmission Rear Case Bushing
53. Output Shaft Thrust Bearing
54. Reverse Clutch Pack
55. Pinion Thrust Washer
56. Planter Long Pinion
57. Low Sun Gear Thrust Washer
58. Low Sun Gear Bushing (Splined)
59. Pinion Thrust Washer TABLE 1-continued OE Powerglide Transmission Parts List (FIG. 6)

60. Parking Lock Gear
61. Transmission Oil Pan
62. Valve Body
63. High Clutch Pack
64. Clutch Piston Return Springs, Retainer and Retainer Ring
65. Clutch Drum Bushing
66. Low Brake Band
67. High Clutch Seal Rings
68. Clutch Drum Thrust Washer (Selective)
69. Turbine Shaft Seal Rings
70. Front Pump Driven Gear
71. Front Pump Drive Gear
72. Stator Shaft
73. Input Shaft

What is claimed is:

1. A ring gear stabilization system for a Powerglide transmission, the Powerglide transmission including a ring gear, a Powerglide output shaft, and a Powerglide planet carrier, the system comprising:
    a radial stabilization plate having a central web surrounded by an annular bearing flange with an overall outer diameter sized to fit inside the ring gear, the central web defining (i) a central opening configured to receive the Powerglide output shaft therethrough and (ii) a plurality of peripheral openings positioned in the central web and dimensioned to receive at least one pinion shaft end when the central web is mounted to the Powerglide planet carrier; and
    a plurality of bearing members configured and dimensioned to (i) be secured to an inner annular surface of the ring gear in a spaced relationship there around, and (ii) bear against said annular bearing flange to stabilize the ring gear.

2. The ring gear stabilization system of claim 1, wherein said plurality of bearing members each have a bearing end having a first diameter and an attachment end having a narrower, second diameter, the diameter of the attachment end being dimensioned to be received in holes in the ring gear.

3. The ring gear stabilization system of claim 1, wherein the annular bearing flange has a smooth outer bearing surface.

4. The ring gear stabilization system of claim 1, wherein said outer bearing surface is adapted to minimize friction with said bearing members.

5. The ring gear stabilization system of claim 1, wherein the Powerglide transmission further includes a reverse clutch pressure plate, the ring gear stabilization system further comprising an annular axial stabilization member with a central opening sized to fit around the ring gear and a thickness selected to occupy space to be eliminated between a mid-step of the ring gear and the reverse clutch pressure plate.

6. The ring gear stabilization system of claim 1, wherein the radial stabilization plate further includes an annular support flange at an outermost diameter of said radial stabilization plate, positioned to extend substantially in parallel with both the ring gear and an outer surface of the planet carrier.

7. The ring gear stabilization system of claim 6, wherein said annular support flange has an axially extending leg configured to extend into a space between the ring gear and planet carrier.

8. A method for stabilizing the ring gear in a Powerglide transmission, the Powerglide transmission including a ring gear, a Powerglide output shaft, and a Powerglide planet carrier, the method comprising:

mounting a radial stabilization plate to a rear facing surface of the Powerglide planet carrier, the radial stabilization plate having a central web surrounded by an annular bearing flange; and attaching a plurality of bearing members to an inner surface of the ring gear in a location opposing said annular bearing flange when the radial stabilization plate is mounted on the planet carrier, wherein said mounting the radial stabilization plate comprises:

positioning the radial stabilization plate in a centered location inside the ring gear with the Powerglide output shaft passing through a central opening in said central web; and securing the central web to the planet carrier.

9. The method of claim 8, wherein said attaching a plurality of bearing members comprises forming a plurality of holes around an inner surface of the ring gear in an area to be adjacent the annular bearing flange when said radial stabilization plate is mounted on the planet carrier.

10. The method of claim 8, wherein said mounting the radial stabilization plate further comprises:

positioning the central web with pinion shaft ends protruding from the planet carrier received in peripheral openings in said central web; and said securing comprises attaching the central web to the planet carrier at other peripheral openings in the central web.

11. The method of claim 10, wherein said positioning the central web centers said radial stabilization plate relative to the planet carrier.

12. The method of claim 10, wherein said attaching comprises welding.

13. A ring gear stabilization system for a Powerglide transmission, the Powerglide transmission including a ring gear, a Powerglide output shaft, and a Powerglide planet carrier, the system comprising:

a radial stabilization plate configured and dimensioned to be mounted on the Powerglide transmission planet carrier inside the ring gear, said radial stabilization plate having a central web surrounded by an annular bearing flange with an overall outer diameter sized to fit inside the ring gear, the central web defining a central opening configured to receive the Powerglide output shaft therethrough and a plurality of peripheral openings positioned in the central web and dimensioned to receive at least two pinion shaft ends protruding from the Powerglide planet carrier, said peripheral openings being positioned so as to center the central web on the planet carrier when said at least two pinion shaft ends are received therein; and a plurality of bearing members configured and dimensioned to be secured to an inner annular surface of the ring gear in a spaced relationship there around, and to bear against said annular bearing flange to stabilize the ring gear when said radial stabilization plate is mounted on the planet carrier.

14. The ring gear stabilization system of claim 13, wherein said peripheral openings further include peripheral clearance openings configured and dimensioned to receive additional pinion shaft ends or other protrusions at said rear of the planet carrier when said central web is mounted thereon.

15. The ring gear stabilization system of claim 14, wherein said peripheral openings further include additional peripheral openings configured and dimensioned to receive attachment means for securing the radial stabilization plate to the planet carrier.

16. The ring gear stabilization system of claim 15, wherein the radial stabilization plate further includes an annular support flange at an outermost diameter of said radial stabilization plate, positioned to extend substantially in parallel with both the ring gear and an outer surface of the planet carrier.

* * * * *

UNITED STATES PATENT AND TRADEMARK OFFICE
CERTIFICATE OF CORRECTION

PATENT NO. : 9,574,653 B2
APPLICATION NO. : 14/567503
DATED : February 21, 2017
INVENTOR(S) : Randall R. Schroeder, Brian G. Rowell and Gregg A. Nader Page 1 of 1

It is certified that error appears in the above-identified patent and that said Letters Patent is hereby corrected as shown below:

In the Claims

Column 8, Claim 4, Line 47. Claim dependency "1" should be "3".

Signed and Sealed this
Twenty-fourth Day of April, 2018

Andrei Iancu
*Director of the United States Patent and Trademark Office*